G. YATES.
WHEEL.
APPLICATION FILED APR. 7, 1920.

1,375,545.

Patented Apr. 19, 1921.
2 SHEETS—SHEET 1.

WITNESSES

INVENTOR
George Yates,
BY
ATTORNEYS

G. YATES.
WHEEL.
APPLICATION FILED APR. 7, 1920.
1,375,545.
Patented Apr. 19, 1921.
2 SHEETS—SHEET 2.
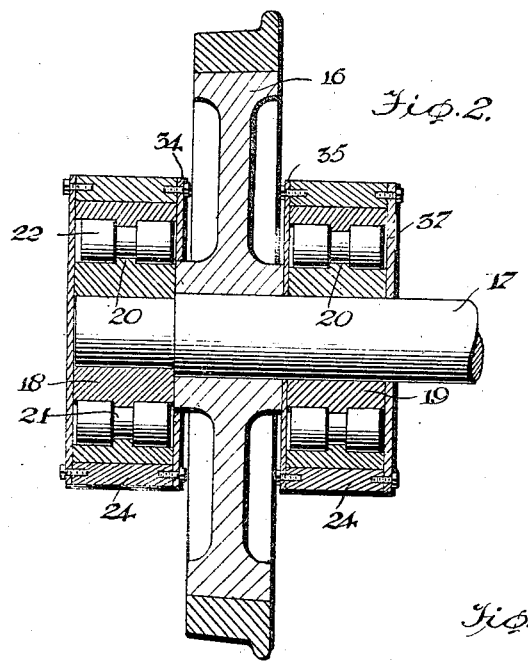
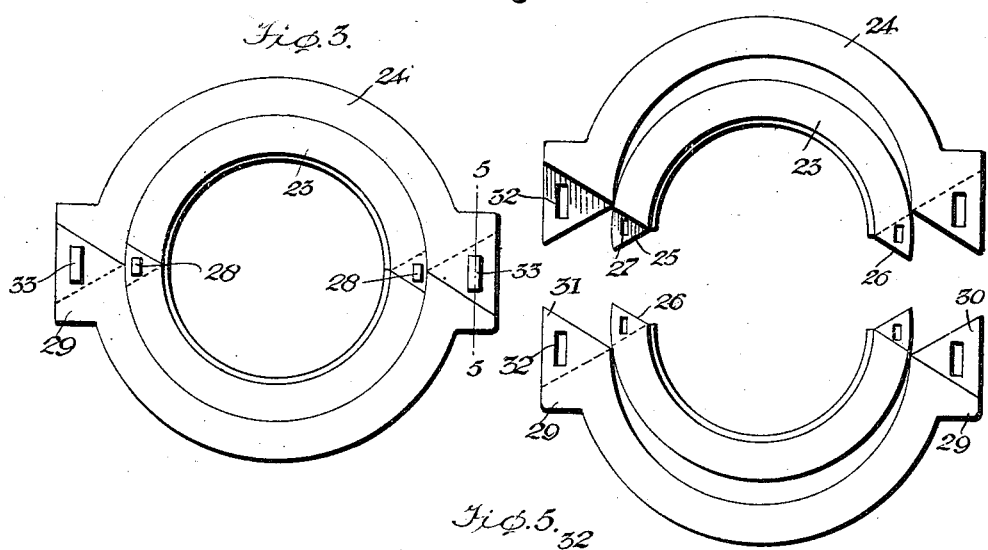
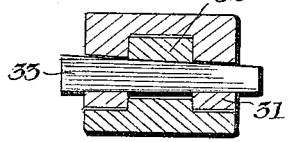
Inventor
George Yates,

UNITED STATES PATENT OFFICE.

GEORGE YATES, OF CHICAGO, ILLINOIS.

WHEEL.

1,375,545. Specification of Letters Patent. Patented Apr. 19, 1921.

Application filed April 7, 1920. Serial No. 371,868.

*To all whom it may concern:*

Be it known that I, GEORGE YATES, a citizen of the United States, and a resident of Chicago, in the county of Cook and State of Illinois, have invented certain new and useful Improvements in Wheels, of which the following is a specification.

My invention is an improvement in wheels, and has for its object to provide a wheel construction wherein roller bearings are arranged between the wheels and journal box, the wheels being rigidly connected.

In the drawings:

Fig. 2 is a vertical view of a modified construction;

Fig. 3 is a view of the roller assembly housing rings shown in Fig. 2;

Fig. 4 is a similar view with the sections of the ring separated; and

Fig. 5 is a view, on line 5—5 of Fig. 3.

Figure 1:
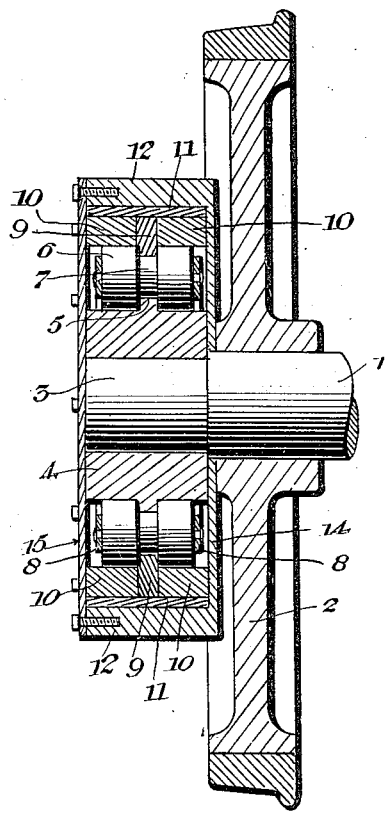
Figure 1 is a vertical section of the improved wheel.

In the embodiment of the invention shown, the wheel and axle assembly consists of the axle 1 of usual construction, upon which is secured the wheel 2, and outside of each wheel on the reduced portion 3 of the axle, a hub 4 is rigidly secured.

This hub 4 has an annular peripheral rib 5, and rollers 6 have annular grooves 7 within which the rib 5 engages. The assemblage of rollers is held by holding rings 8, and the housing for the rollers consists of a central section 9 and lateral sections 10.

The central section 9 is composed of two portions, each portion being a half circle, and said section is of greater thickness than the sections 10, and of a width that it will fit within the grooves 8 of the rollers. The sections 10 are continuous rings, and in placing the housing, the portions of the section 9 are first placed, by inserting them in the grooves 7 until their ends abut, after which the sections 10 are slipped on laterally.

A ring 11 is arranged outside these sections 9 and 10, and a rim portion 12 engages outside of the ring 11. This rim portion which corresponds to the journal box of the usual truck assembly and which is adapted for connection with the truck frame, has a radial web 14 which fits, at its inner edge, between the hub portion 4 of the roller bearing assembly and the hub of the wheel 1.

A housing plate 15 is secured to the outer face of the roller assembly, to prevent displacement of the outer section 10 of the roller bearing housing.

In the embodiment of the invention shown in Fig. 2, the wheel 16 is held on the axle 17, which is provided at each face of the wheel with a roller assembly similar to that shown in Fig. 1. Hubs or annuli 18 and 19 are secured to the axle at the outer and inner faces of each wheel and each of these hubs has an annular central rib 20 on its periphery, which receives the annular groove 21 of the rollers 22. The housing or annuli 23 for the roller assembly are sectional, and are held within other rings 24 which are also sectional. Each of the sections of the ring 23 has at one end a circumferential lug 25 and at the other end a pair of lugs 26, between which the pair of lugs of the other section is received.

Referring to Figs. 3 and 4, it will be seen that the shoulders formed between these lugs and the bodies of the sections are inclined, the arrangement being such that the shoulders at the adjacent end of the sections converge toward each other toward the outer face of the ring. The lugs 25 and 26 have slots 27 which are adapted to register when the sections are pivoted together for receiving wedges 28. The sections of the rings 24 have extensions 29 at their ends, and lugs 30 and 31 extend from the ends of the ring sections, these lugs being shaped similar to the lugs 25 and the shoulders between the lugs and the ring section being shaped the same as the shoulders between the lug sections 25 and the ring sections 23. The extensions 29 provide for varying width lugs 30 and 31, and these lugs have slots 32 which register when the ring sections are pivoted together to receive wedges 34 for clamping the ring sections together. The rings 24 are connected to washers 34 and 35 respectively at the edges of the rings adjacent to the wheel, and at their outer edges they are connected to cover plates 36 and 37. The washer 34 fits over the outer end of the hub of the wheel 16, while the washer 35 fits over the axle. The plate 37 has an opening for the axle, while the cover 36 covers the outer end of the roller assembly. With this construction, the housing ring may be removed, and the rollers also removed, without taking the wheel off the axle. The ring 23 is the outer section of the roller race and the ring 24 is the housing for the roller race.

I claim:—

The combination with an axle, of a wheel having a hub mounted on the axle, spaced inner and outer annuli arranged on opposite sides of said hub and having their opposed sides provided with ribs, annular series of rollers arranged between said spaced inner and outer annuli and having annular grooves receiving said ribs, said outer annuli being formed in sections having their ends formed with interfitting lugs having registering openings, holding rings surrounding said outer annuli and provided with sections having their ends formed with lugs, said second named lugs being formed with registering openings, wedge-shaped keys inserted through said opening for connecting the said sections, the ends of said lugs being beveled, and inner and outer washers secured to said holding rings, one of said washers being provided with an opening snugly receiving said hub.

GEORGE YATES.